United States Patent [19]

Boehm et al.

[11] Patent Number: 4,970,940
[45] Date of Patent: Nov. 20, 1990

[54] VACUUM BRAKE BOOSTER FOR AUTOMOTIVE VEHICLES

[75] Inventors: Peter Boehm, Friedrichsdorf; Wilfried Wagner, Huettenberg; Kai-Michael Graichen, Langen; Ralf Jakobi, Liederbach, all of Fed. Rep. of Germany

[73] Assignee: Alfred Teves GmbH, Frankfurt am Main, Fed. Rep. of Germany

[21] Appl. No.: 421,048

[22] Filed: Oct. 22, 1988

[30] Foreign Application Priority Data

Oct. 22, 1989 [DE] Fed. Rep. of Germany ....... 3836111

[51] Int. Cl.⁵ .............................................. F15B 9/10
[52] U.S. Cl. .................................. 91/369.2; 91/376 R
[58] Field of Search ................ 91/369.2, 369.4, 376 R

[56] References Cited

U.S. PATENT DOCUMENTS

| | | | |
|---|---|---|---|
| 3,838,628 | 10/1974 | Kita | 91/376 R |
| 4,350,076 | 9/1982 | Thiel | 91/376 R |
| 4,587,885 | 5/1986 | Boehm et al. | 91/369.2 |
| 4,589,937 | 6/1986 | Meynier et al. | 91/369.3 |
| 4,598,548 | 7/1988 | Wagner | 91/369.2 |
| 4,598,625 | 7/1986 | Belart | 91/369.3 |
| 4,729,288 | 3/1988 | Thioux | 91/376 R |
| 4,777,865 | 10/1988 | Gautier | 91/376 R |
| 4,784,038 | 11/1988 | Gautier | 91/369.2 |

Primary Examiner—Ronald C. Capossela
Attorney, Agent, or Firm—Robert P. Seitter

[57] ABSTRACT

A vacuum brake booster in which the guiding sleeve (14) for the push rod (29) has an annular ring which defines a cylindrical guiding surface (22) and is guided, in axial movements of the guiding sleeve, by a guide bore in the housing (10) of the control valve.

10 Claims, 2 Drawing Sheets

VACUUM BRAKE BOOSTER FOR AUTOMOTIVE VEHICLES

BACKGROUND OF THE INVENTION

The present invention relates to a vacuum brake booster for automotive vehicles and is of the type having a vacuum housing sealingly subdivided into a vacuum chamber and a working chamber by an axially movable wall which is prestressed by a return spring. A mechanically actuable control valve connects the working chamber to the vacuum chamber or the atmosphere. The axially movable housing of the control valve is made of thermoplastic material and accommodates, within an axial bore, a rubber-elastic reaction disk which is abutted by a push rod for transmitting the braking force to an actuating piston of a master cylinder which is mounted on the vacuum housing on the vacuum side. The movable wall is connected to the control valve housing and a guide sleeve, having a radial flange, serves to guide the push rod axially.

A vacuum brake booster of this type is disclosed in U.S. Pat. No. 4,892,027 entitled "Vacuum Brake Power Booster for Automotive Vehicles and Method for Its Manufacture" which corresponds to German Published Patent Application (DE-OS) No. 37 09 172. In the brake booster disclosed in U.S. Pat. No. 4,892,027, the radial flange of the guide sleeve is axially supported within the bore of the control valve housing which receives the reaction disk and is retained axially, in a positive manner, by a holding element connected to the control valve housing. The holding element is formed either by a radial shoulder on the control valve housing or by radially inwardly directed projections formed on the control valve housing or on a retaining ring, with the outside or inside surface of the retaining ring being attached to the surface of the control valve housing, for example, by ultrasonic or friction welding or by an adhesive. The arrangements just described can suffer from inaccuracies, might be unsafe, and can involve high cost.

In another vacuum brake booster disclosed in U.S. Pat. No. 4,898,073 entitled "Vacuum Brake Force Booster for Use with Automotive Vehicles" which corresponds to German Patent Application No. 37 40 691.4, the guide sleeve has an axial extension which is provided to eliminate the danger of damage to the control valve housing in the area of support for the guide sleeve. Both the reaction disk and an abutting pressure plate are received in the axial extension of the guide sleeve which, in turn, is fitted and sealed in the axial bore of the control valve housing. In the brake booster disclosed in U.S. Pat. No. 4,898,073, the radial support of the axial extension of the guide sleeve is provided only by the wall of the axial bore in the control valve housing in an area of small wall thickness, so that the control valve housing can be susceptible to damage due to bending forces acting on the push rod.

SUMMARY OF THE INVENTION

It is, therefore, an object of the present invention to provide a vacuum brake booster which greatly mitigates the aforementioned disadvantages and particularly the danger of damage to the control valve housing by transverse forces.

This object is achieved, according to the present invention, by shaping the radial flange of the guiding sleeve into a cylindrical guiding segment which is axially guided within the control valve housing. This results in a vacuum brake booster for automotive vehicles in which a considerable increase in operating reliability is achieved and excellent guidance of the push rod, as well as transmission of the highest retaining forces, is provided.

According to another aspect of the present invention, the cylindrical guiding segment has a radial collar on which the return spring is supported to retain the guiding sleeve in place.

In order to permit the use of smaller diameter reaction disks with the same braking forces, according to another aspect of the present invention, the radial flange of the guiding sleeve is supported by a metallic insert containing the reaction disk as well as the flange of the push rod. This provides effective protection of the plastic control valve housing against the high pressures in the reaction disk and permits closer fitting between the metallic insert and the flange of the push rod as well as the ratio variation disk arranged between the control valve piston and the reaction disk.

In order to avoid jamming of the push rod, in another embodiment of the present invention, the guiding sleeve has a cylindrical shape and the push rod rests against the reaction disk by means of a pressure plate which is separate from the push rod.

Finally, in order to permit quick evacuation of the working chamber of the vacuum brake booster constructed in accordance with the present invention, the radial flange has openings in the area where a vacuum channel, which is formed in the control valve housing, ends.

Further details and advantages of a vacuum brake booster constructed in accordance with the present invention will become evident from the following description of two embodiments which will be explained in more detail with reference to the accompanying drawings wherein corresponding parts are provided with like reference numerals.

DETAILED DESCRIPTION OF THE INVENTION

Figure 1:
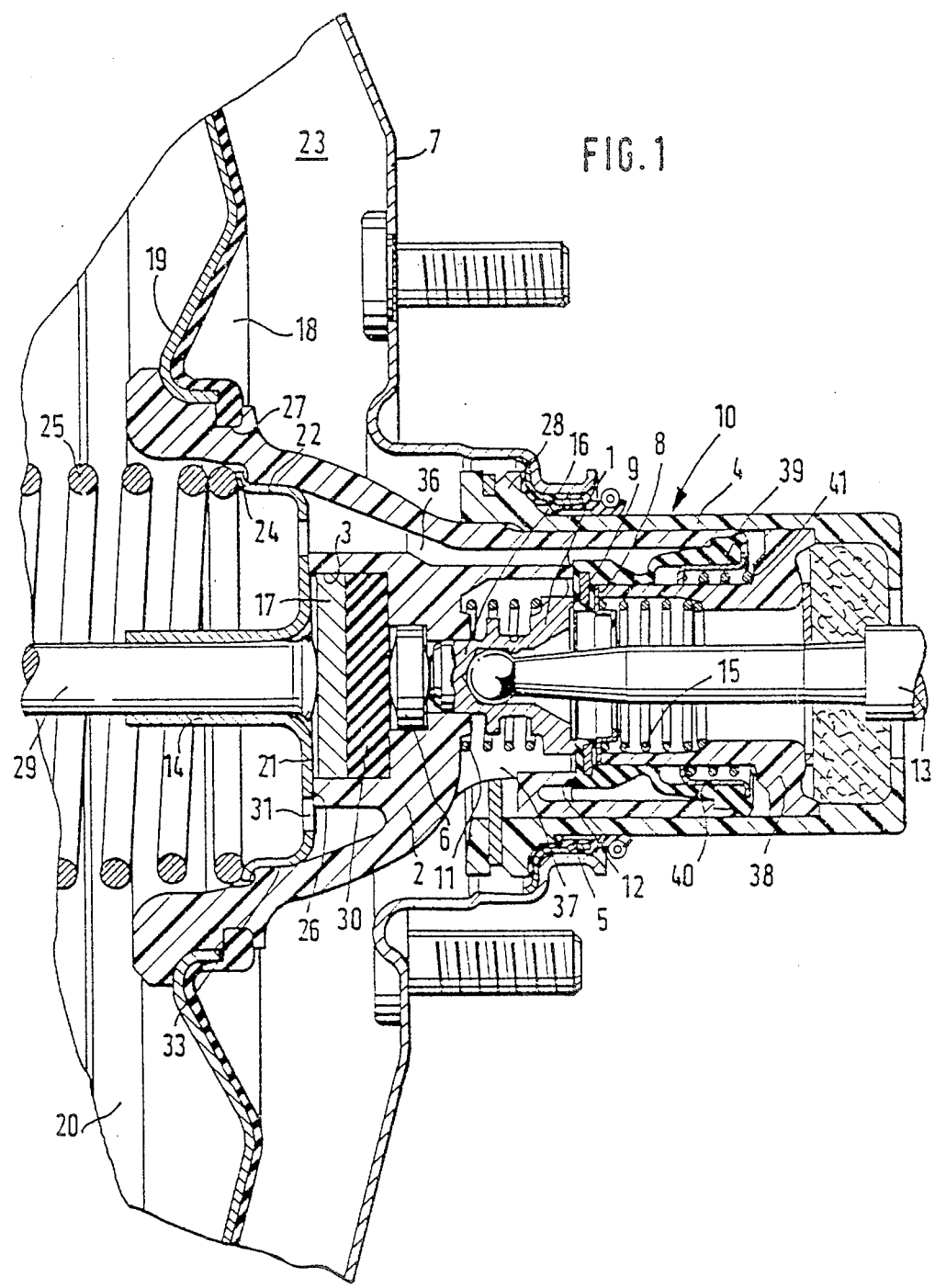
FIG. 1 is a partial longitudinal section of a first embodiment of a vacuum brake booster according to the present invention.

The housing of the brake booster consists of two housing parts interconnected at a joint by means of interlocking indentations. For the sake of clarity, only the brake-pedal-side housing part 7 is shown in part. A booster piston 19 subdivides the interior of the housing into a vacuum chamber 20 communicating, through a connection, with a vacuum source (not shown) and a working chamber 23. The booster piston 19 has a rolling diaphragm 18 in abutment therewith in the working chamber 23. A two-piece control valve housing 10 is connected with the booster piston 19 and the rolling diaphragm 18. The rolling diaphragm 18 is clamped at the joint 27 in a pressure-tight manner and, at its inner portion, encompasses the inside edge of the booster piston 19 and seals the booster piston against the control valve housing 10. The cylindrical guide portion 4 of the control valve housing 10 protrudes from the booster housing 7 and a bellows (not shown) protects the surface of this portion of the control valve housing 10 against becoming soiled. The control valve housing 10 seals the working chamber 23 by means of a guide slide ring 5.

A control rod, composed of a piston rod 13 and a valve piston 16, is arranged to be axially displaceable within the control valve housing 10. The control rod is adapted for connection with a brake pedal of an automotive vehicle via a fork head (not shown). The control valve housing 10 also contains a valve arrangement 1, 9, and 12 actuated by the valve piston 16 and, through channels 36 and 37, controls the pressure difference between vacuum chamber 20 and working chamber 23. The front part 2 of the control valve housing 10 is arranged in the vacuum chamber 20 and has a bore 3 within which a reaction disk 30 and a pressure plate 17 are arranged. A push rod 29, abutting the pressure plate 17, actuates a master brake cylinder (not shown) fastened on the front side of the booster housing.

A return spring 25, clamped between the front part 2 of the control valve housing 10 and the bottom of the booster housing, is provided for resetting the booster piston 19.

FIG. 1 shows the control assembly of the vacuum brake booster in the release position, namely, in a position with the two chambers 20 and 23 separated from each other. In this position, the two sealing seats 9 and 12 abut the sealing surface of a poppet valve 1 which has a stop 8 on the side facing away from the sealing surface. Stop 8, through a sleeve 38, will sweep the guide portion 4. In the release position, the guide portion 4 rests with its collar 28 on the guide slide ring 5 and the sealing seat 9 on the control valve piston 16 is pushed by a piston rod return spring 11 against the sealing surface of the poppet valve 1. Simultaneously, the poppet valve 1 is prestressed, by means of a compression spring 15, toward the two sealing seats 9 and 12. The other end of the compression spring 15 is supported on the sleeve 38. Also a second compression spring 39 is provided which is supported, at one end, on a guide device 40 of the poppet valve 1 and, at an opposite end, on an annular surface 41 of the sleeve 38, to keep the two control valve housing parts 2 and 4 apart.

In order to achieve precise guidance of the push rod 29, a guiding sleeve 14 is provided. The radial flange 21 of the guiding sleeve 14 is supported on an annular surface 26 of the front part 2 of the control valve housing and is shaped into an annular ring having a cylindrical guiding surface 22 which cooperates with a cylindrical portion 33 formed on the front part 2, so that the bending forces acting on the push rod 29 are efficiently taken up. The radial flange 21 is provided with several openings 31 in the area where the vacuum channel 36 ends. The return spring 25, supported on a radial collar 24 at the end of the cylindrical guiding surface 22, retains the radial flange 21 in place. Because the push rod 29 is separate from the pressure plate 17, the guiding sleeve 14 can be formed into a cylindrical shape as illustrated.

The reaction disk 30, in this embodiment of the invention, is arranged in a section of the stepped bore 3 which faces the vacuum chamber 20. A ratio variation disk 6, which cooperates with the control valve piston 16 and whose surface contacts the reaction disk 30, is arranged in the second, smaller-diameter section of the bore to govern the transmission ratio of the brake apparatus.

Figure 2:
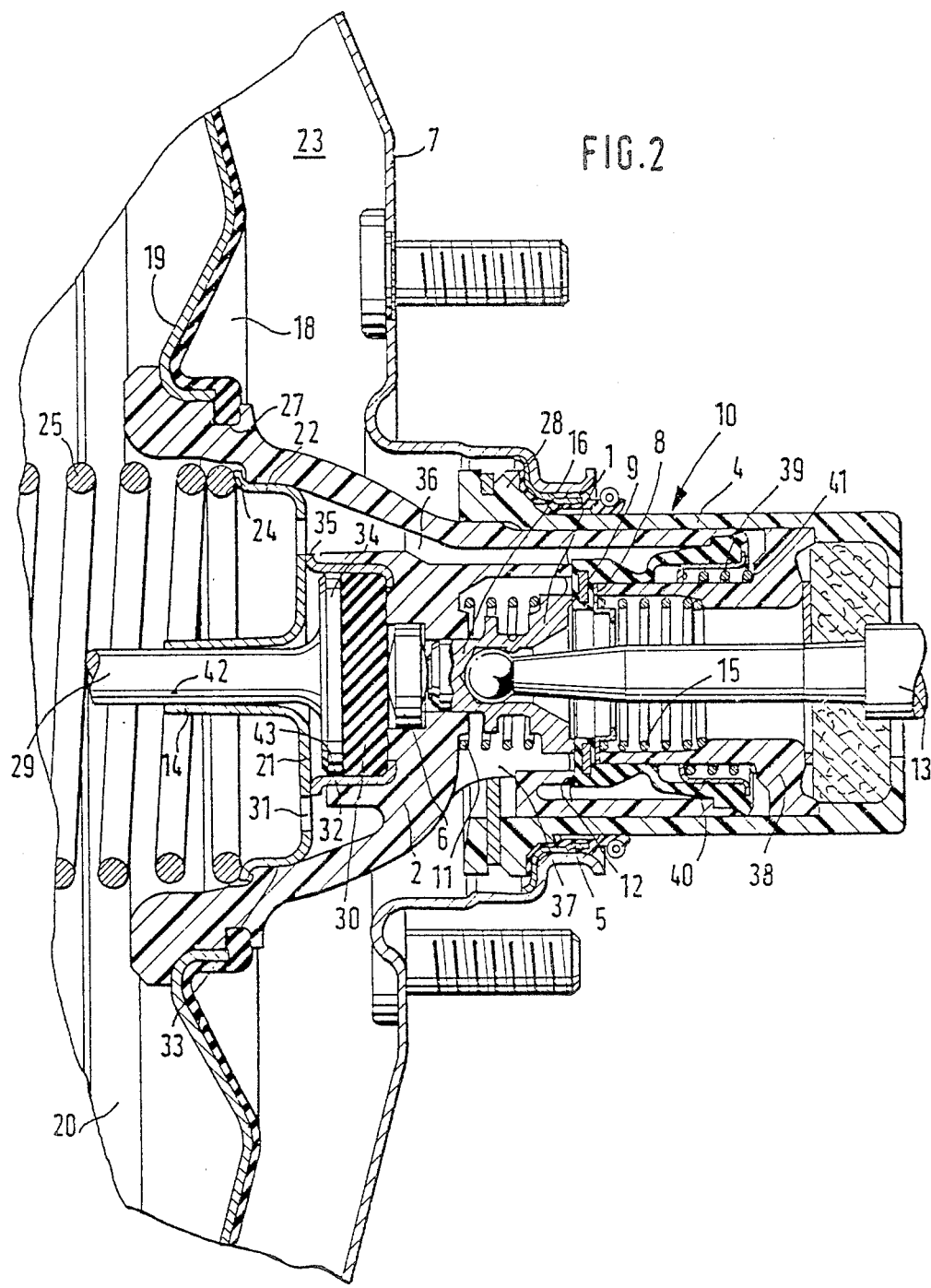
FIG. 2 is a partial longitudinal section of a second embodiment of a vacuum brake booster according to the present invention.

In the embodiment of the invention shown in FIG. 2, the push rod 29 abuts the reaction disk 30 by means of a flange 34 formed integral with the push rod 29. In this arrangement, the reaction disk 30, as well as the flange 34, are contained by a metallic ring insert 32. The end of the insert 32 protruding from the axial bore 3 is provided with a radial expansion 35 which serves as an abutment surface for the radial flange 21 of the guiding sleeve 14, whereby the insert 32 is held in place. In this embodiment of the invention, the guiding sleeve 14 is conically shaped, so that its smaller diameter end remote from the control valve housing 10 and 2, forms a first guiding point 42 for the push rod 29. The second guiding point 43 lies at the point of contact of the flange 34 with the metallic insert 32. By enlarging the diameter of the guiding sleeve 14 at the end facing the control valve housing 10 and 2, jamming of the push rod 29 is mitigated.

What is claimed is:

1. A vacuum brake booster for automotive vehicles comprising:
   a vacuum housing sealingly subdivided into a vacuum chamber and a working chamber by a wall movable along an axis;
   a mechanically operable control valve for connecting said working chamber with said vacuum chamber or the atmosphere and having:
   (a) a thermoplastic material housing movable along said axis in response to the application and removal of the braking force and having an axial bore extending along said axis and a guide bore extending along said axis,
   (b) means for attaching said movable wall to said housing, and
   (c) valving means for permitting and blocking fluid flow between said vacuum chamber and said working chamber in response to the application and removal of a breaking force;
   a guiding sleeve movable along said axis and having:
   (a) a tubular portion extending along said axis,
   (b) a radial flange extending away from said tubular portion, and
   (c) an annular ring extending from said radial flange away from said axial bore and positioned within said guide bore of said control valve housing;
   a rubber-elastic pressure disk within said axial bore in said control valve housing and movable with said control valve housing;
   a push rod plate within said axial bore in said control valve housing in abutment with said pressure disk and movable with said control valve housing;
   and a push rod extending though said tubular portion of said guiding sleeve for movement along said axis and adapted for connection to an actuating piston of a master cylinder for transmitting to the actuating piston, in response to movement of said push rod plate, a braking force applied to said control valve housing.

2. A vacuum brake booster according to claim 1 wherein said annular ring of said guiding sleeve defines a cylindrical surface and said guide bore in said control valve housing defines a cylindrical surface.

3. A vacuum brake booster according to claim 2 wherein said guiding sleeve further includes a collar extending radially from said annular ring of said guiding sleeve and said guide bore in said control valve housing has an annular recess within which said collar is positioned.

4. A vacuum brake booster according to claim 3 further including a spring bearing against said collar of said guiding sleeve and urging said collar against said annular recess in said guide bore in said control valve housing.

5. A vacuum brake booster according to claim 1 wherein said radial flange is positioned against a surface of said control valve housing surrounding said axial bore.

6. A vacuum brake booster according to claim 5 wherein said push rod and said push rod plate are an integral unit and said tubular portion of said guiding sleeve has a conical inner surface with the smaller diameter end of said tubular portion remote from said surface of said control valve housing against which said radial flange of said guiding sleeve is positioned.

7. A vacuum brake booster according to claim 6 further including a ring insert positioned within said axial bore in said control valve housing and within which said pressure disk and said push rod plate are positioned.

8. A vacuum brake booster according to claim 5 wherein said push rod and said push rod plate are separate components and said tubular portion of said guiding sleeve has a cylindrical inner surface.

9. A vacuum brake booster according to claim 7 wherein said radial flange of said guiding collar has a plurality of openings through which fluid flows when said vacuum chamber and said working chamber are connected.

10. A vacuum brake booster according to claim 8 wherein said radial flange of said guiding collar has a pluarlity of openings through which fluid flows when said vacuum chamber and said working chamber are connected.

* * * * *